Feb. 19, 1946. A. BOYNTON 2,394,977
BOTTOM HOLE REGULATOR AND CHOKE
Filed Sept. 17, 1941 3 Sheets-Sheet 1

Alexander Boynton, Inventor,

By *[signature]*

Attorneys.

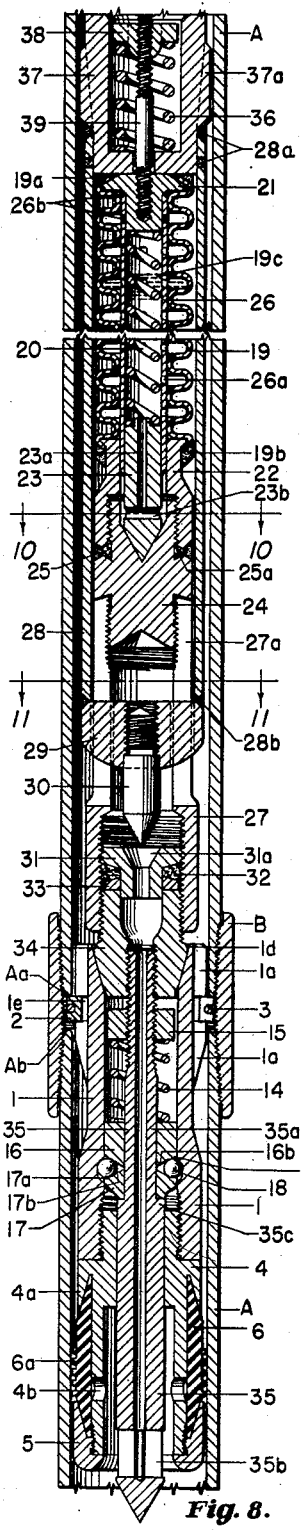
Fig. 8.
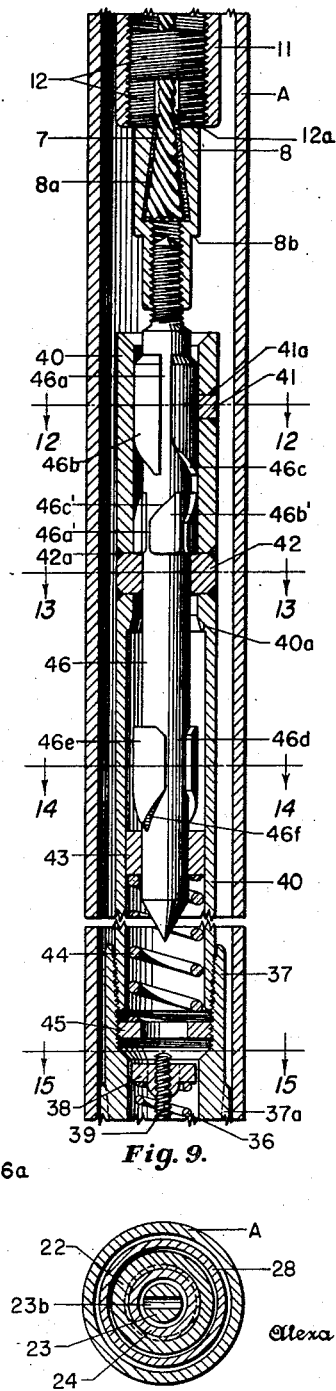
Fig. 9.
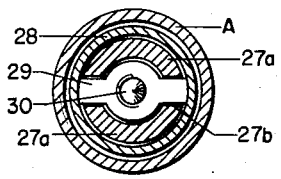
Fig. 11.
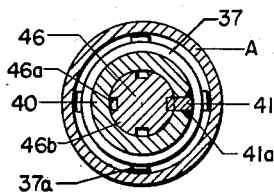
Fig. 12.
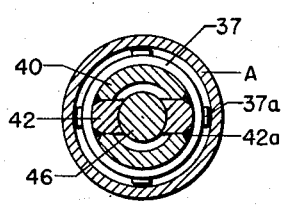
Fig. 13.
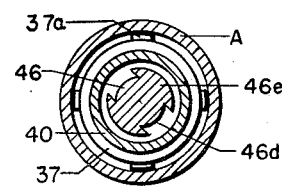
Fig. 14.
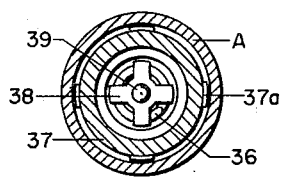
Fig. 15.
Fig. 10.
Alexander Boynton, Inventor, Feb. 19, 1946. A. BOYNTON 2,394,977
BOTTOM HOLE REGULATOR AND CHOKE
Filed Sept. 17, 1941 3 Sheets-Sheet 3
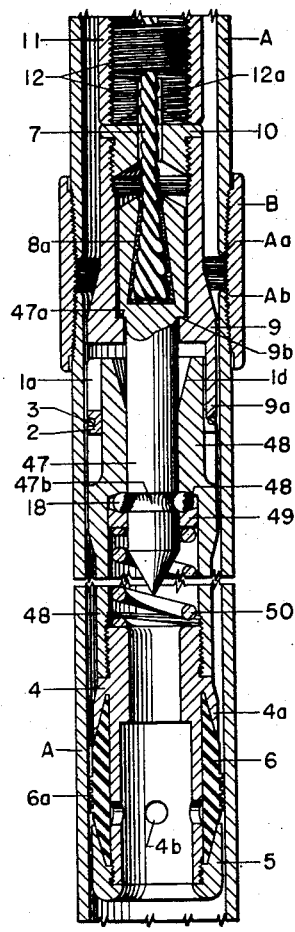
Fig. 16.
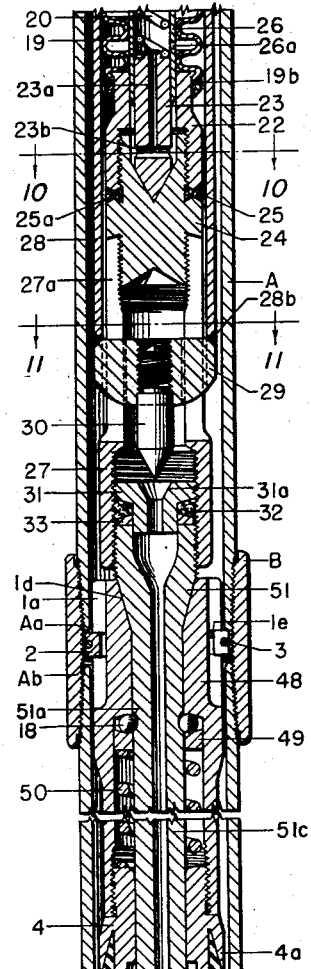
Fig. 18.
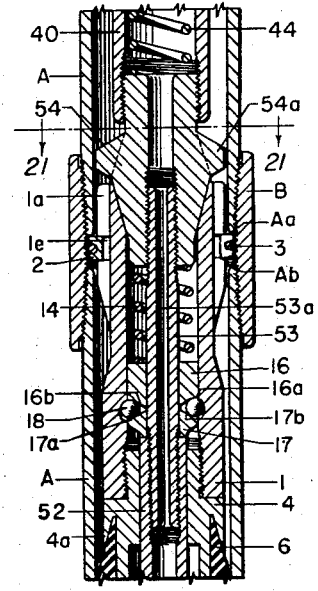
Fig. 19.
Fig. 20.
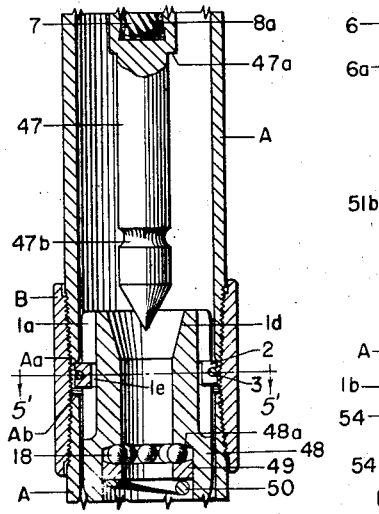
Fig. 17.
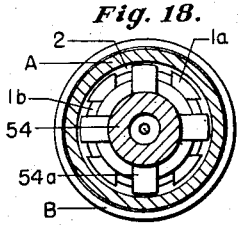
Fig. 21.
Alexander Boynton, Inventor,
By *[signature]*
Attorneys.

Patented Feb. 19, 1946

2,394,977

UNITED STATES PATENT OFFICE 2,394,977

BOTTOM HOLE REGULATOR AND CHOKE

Alexander Boynton, San Antonio, Tex.; Sida S. Martin executrix of said Alexander Boynton, deceased Application September 17, 1941, Serial No. 411,253

12 Claims. (Cl. 166—2)

My invention relates to bottom hole pressure regulators, bottom hole chokes, anchoring means for securing them in the well, and catching and releasing tools in combination with such regulators or chokes, and anchoring means.

An object is to securely set an anchoring shell in the tubing at any desired place in the lower regions of a well without the necessity of pulling the tubing out of the well.

Another object is to secure either a pressure regulator or a choke to such shell by means operative from the top of the well.

Another object is to remove such regulator or choke and replace either with the same or the other by means operative from the top of the well.

A further object is to effect either of said purposes by the use of tools which may be lowered into the well upon either a cable, rods, or tubing.

The bottom hole regulator and choke are free from the freezing temperatures frequently caused by the use of similar devices above the ground surface.

In this specification, it will be assumed that a cable will be employed for running all tools into the well and removing them therefrom, with the understanding that rods or tubing may be substituted therefor at will. It will also be assumed that the anchoring shell and regulator or choke will be set in the tubing although the same operation can be performed in the casing or liner with equal facility.

I accomplish the foregoing objects as follows:

1. An anchoring shell adapted to have either a bottom hole regulator or a bottom hole choke attached to it, or both in combination, is lowered by means of a cable attached to a latch, which latch is releasably attached to the anchoring shell. The shell being lowered to the proper depth, a weight is dropped over the cable cutting a wire and releasing an expansible ring which engages the tubing.

2. The anchoring shell being set in the tubing, I lower a regulator or choke or both combined attached to a catching and releasing tool which releases the regulator or choke as soon as the same is connected to the shell by latching means.

3. To remove either the regulator or the choke, or both if combined, I lower a catching and releasing tool which fastens to the regulator or choke and is adapted to transmit pulling force from a cable to overcome the latching engagement between the regulator or choke and the anchoring shell.

4. I then lower another regulator or choke or both in combination and fasten same to the previously anchored base by means of a tool which, at the same time, releases the newly set regulator or choke, or combination of both, the same being secured to the anchoring shell by means of a latch.

The foregoing objects are attained in the manner above stated by mechanism illustrated in the accompanying drawings, in which—

Fig. 8 is a longitudinal section through the lower portion of the pressure regulator and choke assembly and all of the anchoring shell, both in place.

Fig. 9 is a longitudinal section through the upper portion of the regulator completing the showing in Fig. 8 with the placing tool ready to release the regulator, the placing tool being shown in outside view.

Fig. 10 is a cross-section on the line 10—10, Fig. 8.

Fig. 11 is a cross-section on the line 11—11, Fig. 8.

Fig. 12 is a cross-section on the line 12—12, Fig. 9.

Fig. 13 is a cross-section on the line 13—13, Fig. 9.

Fig. 14 is a cross-section on the line 14—14, Fig. 9.

Fig. 15 is a cross-section on the line 15—15, Fig. 9.

Fig. 16 is a longitudinal section through the first modified form of the anchoring shell and placing tool.

Fig. 17 is a longitudinal section through a portion of the first modified form of the anchoring shell in place with the modified placing tool coming out.

Fig. 18 is a longitudinal section through the first modified form of the anchoring shell in place with the lower portion of the regulator in place.

Fig. 19 is a longitudinal section of the choke in place in the preferred embodiment of the anchoring shell.

Fig. 20 is a longitudinal section through the choke in place in the modified form of the anchoring shell.

Fig. 21 is a cross-section on the line 21—21, Figs. 19 and 20.

Similar characters of reference are employed to designate similar parts throughout the several views.

The invention will be described by units and operations as follows:

(1) The anchoring shell assembly.
(2) The placing tool assembly.
(3) The anchoring shell and placing tool in combination.
(4) The pressure regulator and choke assembly.
(5) The pressure regulator and/or choke lowering tool.
(6) Removing the regulator and choke assembly.
(7) The modified form of anchoring shell and placing tool.
(8) The regulator set with the modified form of the anchoring shell.
(9) The choke with the preferred form of latch.
(10) The choke with the modified form of latch.

The latch in this construction is similar to the type disclosed in my co-pending application, Serial No. 267,193, filed April 10, 1939, now Pat. No. 2,329,182, granted September 4, 1943. The pressure regulator in this application is similar to the regulator disclosed in my Patent No. 2,007,-363, and nothing in the regulator herein set out is thought to be new, except the means for preventing the bellows from possible damage by extremely great external pressures, this latter feature being also set out and claimed in my co-pending application, Serial No. 411,254, filed September 17, 1941, now Pat. 2,353,612, granted July 4, 1944.

The anchoring shell assembly

Figure 1:
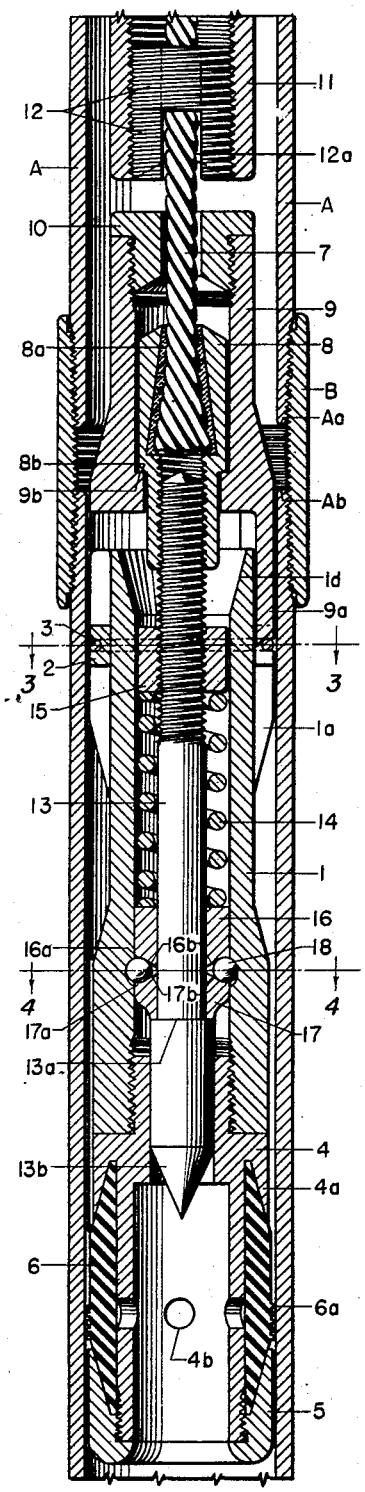
Fig. 1 is a longitudinal section through the assembled anchoring shell and placing tool assemblies.
Figure 2:
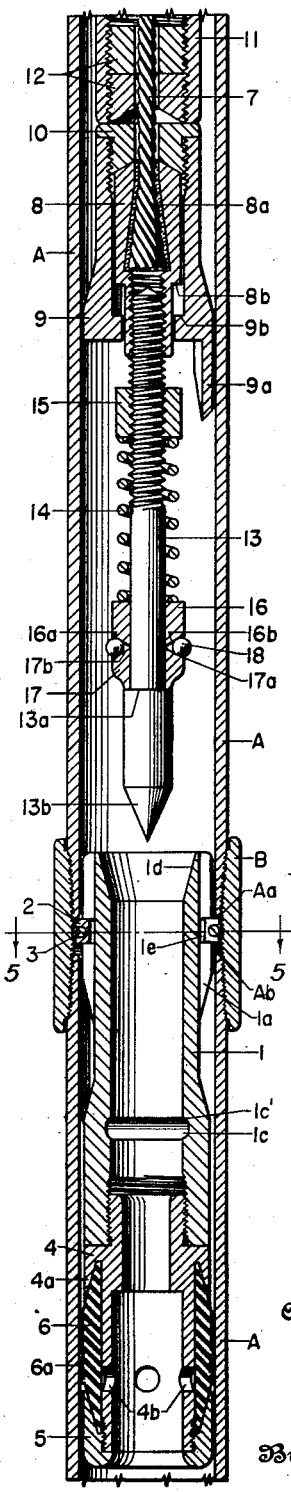
Fig. 2 is a longitudinal section through the anchoring shell in place with the placing tool removed.
Figure 3:
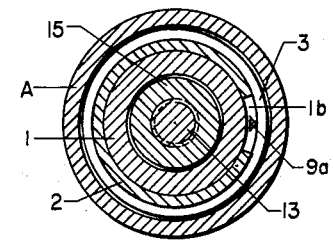
Fig. 3 is a cross-section on the line 3—3, Fig. 1.
Figure 4:
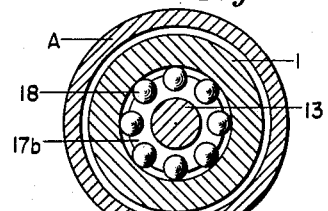
Fig. 4 is a cross-section on the line 4—4, Fig. 1.
Figure 5:
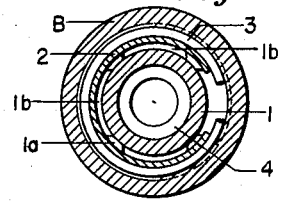
Fig. 5 is a cross-section on the line 5—5, Fig. 2.
Figure 6:
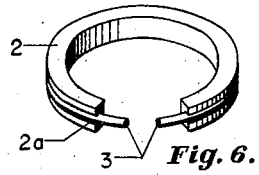
Fig. 6 is a perspective of the anchoring ring and compression wire showing the wire cut and the ring expanded.
Figure 7:
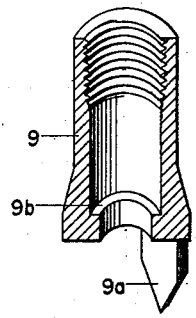
Fig. 7 is a longitudinal section through the wire-cutting member.

In Fig. 2, the anchoring shell assembly is shown in place within the tubing of a well. The base shell 1 has lateral ribs 1a formed by the slots 1b. The setting ring 2 is fitted freely within the external recess 1e of the ribs 1a. In its most contracted position in Fig. 1, this ring is held compressed by the wire band 3 in the circular slot 2a, Fig. 6. In its most expanded position, the ring is adapted to engage the coupling B between the tubing ends Aa and Ab as in Fig. 2.

The latch ball recess 1c, Fig. 2, is adapted to receive the latch balls 18, as shown in Fig. 1. The packer holder nipple 4, having the external hood-like flange 4a adapted to house the upper tapered end of the packer 6, is threadedly engaged within the shell 1. The lower hood-like flanged member 5, retaining the lower tapered end of the packer, has threaded connection with the lower end of the nipple 4.

The openings 4b provide for the packer to be expanded by internal fluid pressure. The slots 1b afford means for the escape of pressure fluid from the annular space between the tubing A and the shell 1; while the circular ribs 6a of the packer 6, having slight clearance with the tubing, hinder the passage of the well gas through that space, thereby causing the well fluid to act through the openings 4b to expand the packer against the tubing.

The placing tool assembly

The cable 7 and the cable attachment member 8 are secured together by the babbitt 8a (see Figs. 1, 2, 9, and 16). The knife shell 9, having an appendage formed into a knife 9a, has slight clearance over the member 8. The internal annular shoulder 9b of the shell 9 is adapted to be engaged under the external annular shoulder 8b of the cable attachment 8. The retainer plug 10, threadedly engaged within the shell 9, has end clearance with the member 8.

The latch shaft 13, having threaded connection with the member 8, is formed with a lower pointed end 13b which serves as a guide for inserting the tool into the shell 1. The coiled spring 14, installed under some compression, has a free clearance over the member 13, and is urged to engage the ball rider member 16 by the spring compression adjusting ring 15 having threaded engagement over the shaft 13. The ball floor 17 rests upon an external shoulder 13a of the member 13 and retains the latch balls 18 between it and the member 16. These balls are retained from becoming disengaged from their position between the members 16 and 17 by the overhanging annular lip 16a and the upstanding annular lip 17a of the members 16 and 17, respectively, as appears in Fig. 2. The balls 18 thus are contained for slightly more than one-half of their diameter between their upper and lower engaging members. The sloping surfaces 16b and 17b of the respective members 16 and 17 permit the latch balls to roll inwardly upon these surfaces when the shaft 13 is raised from the position show in Fig. 1. This movement, caused by the balls forcibly contacting the roof 1c' of the recess 1c, Fig. 2, will raise slightly the member 16, at the same time slightly compressing the spring 14.

The anchoring shell and placing tool in combination

When the anchoring shell and placing tool assemblies are engaged as shown in Fig. 1, it will be observed that the latch balls 18 are engaged within the recess 1c (Fig. 2) and that the ring 2 is compressed by the wire 3 which may have its ends welded together, for convenience of assembly. The knife 9a which is slidable in either of the slots 1b, of the shell 1, is positioned in one of these slots and rests upon the wire 3 while the assembly is being lowered. After the anchoring shell and setting tool assembly has been lowered to the desired place within the tubing, the weight 11 is dropped over the cable. The impact of this weight upon the member 10 will cause the knife 9a to cut the wire 3. The setting ring 2 instantly expands and engages the tubing A. The cable is then raised until the ring 2 reaches a tubing coupling, when the ring will expand further and become engaged under the tubing end Aa. Again the cable is pulled upon until the latch springs loose; whereupon the setting tool assembly may be withdrawn, leaving the anchoring shell assembly set in place as shown in Fig. 2.

The taper of the knife edge is such that the wire will always be cut before the latch will be sprung.

It will be noted that the weight 11 has a central opening of slightly greater diameter than that of the member 8 in order that the weight may be placed over or removed from the cable at will. Each of the guide rings 12 has a side opening 12a enabling them to be placed over the cable to guide the weight to land upon the plug 10.

*The pressure regulator and choke assembly*

The pressure regulator described, but not claimed herein, is claimed in my co-pending application Serial No. 411,254, filed September 17, 1941.

The metallic bellows 19 is hermetically sealed at its upper end by the connection 21 and the solder or weld 19a and is sealed likewise at its lower end by the connection 22 and the solder or weld 19b. Interior of the bellows, the guide pipe 26 may be pressed over the depending extension of the connection 21 and secured thereto by the welds 26b, as appears in Fig. 8. This guide pipe has slight clearance within the bellows and over the spring 20 and its base member 23. The end clearance between the guide pipe 26 and the base member 24 is such as will allow the bellows to be compressed somewhat further than necessary to seat the valve 30.

The bellows may be filled partially with a liquid such as glycerine or lubricating oil, the top of which is indicated at 19c, leaving an air pocket above the liquid within the bellows. The lateral openings 26a of the guide pipe and the central opening 23a and cross bore 23b of the base member 23, provide for free circulation of the bellows-contained liquid during the compression and expansion movements of the bellows.

The members 22 and 24, which are shown threadedly joined together, may have their engagement made hermetic by the weld 25 and the packing 25a.

The member 24 has threaded engagement within the semi-circular uprights 27a of the bellows-anchoring member 27. The valve base bar 29 may be welded into slots within the lower end of the valve driving sleeve 28, as shown at 28b. This valve base bar is slidable within the slots 27b between the semi-circular uprights 27a (see Fig. 11). The valve 30, adapted to engage the seat 31a of the member 31, has threaded engagement with the bar 29.

The valve-driving sleeve 28 shown pressed over the lower end of the shell 37 may be secured to it further by the welds 28a. The valve seat member 31, having threaded engagement within the member 27, has the gland ring 33 placed about its lower tubular extension. This ring, contacting the member 34, engages the packing 32 and may compress it by force of the threaded engagement between the members 27 and 34.

The rod 39, which has slight clearance through the internal flange of the shell 37 and is engaged threadedly within the bellows upper end connection 21, is positioned centrally of the coiled spring 36 which has slight clearance within the shell 37 and relatively large clearance over the rod. The winged nut 38 upon the upper end of the rod 39 holds the spring 36 under some compression. The guide fins 37a of the shell 37 serve to align the valve driving sleeve 28 with the tubing in order that the valve 30 will engage upon its seat when the bellows is compressed in a manner which will now be explained.

Well fluid entering the latch tube and choke member 35 from below through the slots 35b and the choke passage 35a will contact the exterior of the bellows which, being yieldable and pressure responsive, will contract upon the air pocket above the liquid level 19c.

At a predetermined pressure, the valve 30 will close upon its seat 31a because the bellows is free at its upper end to which the valve driving sleeve 28 is attached. When the pressure upon the bellows decreases below that required to close the valve, it is evident that the valve will again open. In this manner, the regulator will maintain a constant predetermined pressure within the tubing above the valve 30.

Metallic bellows now being manufactured of very strong corrosive-resistant materials, such as Monel metal and stainless steel, the regulator will have long life and will not be ruptured by excessive external pressures, because there is no great difference between the internal and external pressures, due to the air pocket within the bellows and the moderate force required to compress the bellows and the springs 20 and 36.

After the valve 30 seats, if excessive external pressure should contact the bellows, the spring 36 will continue to compress; thereby permitting the bellows to compress further the air pocket inside and thus avoid the danger of being deformed by the pulling strain, which would be exerted upon it by great external pressure in the absence of this spring.

When the pressure regulator and choke assembly is in place as in Fig. 8, it will be observed that the latch is engaged in the same manner as shown and described in connection with Fig. 1, the enlargement 35c being provided as a support for the latching assembly. The force of the weight 11, transmitted through the tool 46 and the spring 44, causes the latch to engage.

The valve seat member 31 may be screwed upwardly to lessen the valve travel and thereby reduce the pressure required to close the valve, or the member 31 may be screwed downwardly to increase the valve-closing pressure, as is apparent.

When the regulator and choke assembly is set and the latch is engaged as in Fig. 8, it will be observed that the latch balls 18 are engaged under the roof 1c' (see Fig. 2) and that there is clearance under the balls between them and the shell 1, as appears in Figs. 1 and 8. This engagement causes the latch to pull the regulator and choke assembly downward, thus holding a strong contact between the connection member 34 and the valve seat 1d formed upon the base shell 1. This engagement and the closure of the packer element 6 upon the tubing wall forces the well fluid to take path through the passage 35a, which discharges through the central opening of the member 31, this opening being controlled by the valve 30.

*The pressure regulator and/or choke lowering tool*

Fig. 9, which is an upward continuation of Fig. 8, shows that the regulator has just been set in place and is now ready to be left there.

The regulator or choke placing and removing tool, otherwise termed the catching and releasing tool 46, has an extension threadedly engaged within the member 8 which is attached to the cable 7 by the babbitt 8a, the connection means being the same as was employed for the latch shaft 13 in Fig. 1. The shell 40 has the guide lug 41 set into it and secured by the weld 41a, also the holding lugs 42 set into it and secured by the welds 42a. The upper portion of the shell 40 has slight clearance over the lands of the tool 46 and the lugs 41 and 42 have slight clearance with the rod-like core of this tool.

The spring rider ring 43, slidable within the lower portion of the shell 40, is engaged normally under the shoulder 40a by the coiled spring 44 resting upon the spring base ring 45 which has threaded engagement within the shell 37.

While the regulator assembly and the attached catching and releasing tool are being lowered, the lands 46e of the tool are engaged under the holding lugs 42, the ring 43 then contacting the lower ends of the lands 46e, but when the regulator is landed, as in Fig. 8, and the valve-like lower end of the member 34 is closed upon its seat in the upper end of the shell 1, the weight 11 causes the spring 44 to be compressed by the engagement of the wedge-shaped ends 46f upon the ring 43 until the lands 46b' engage upon the lugs 42, the slots 46a' being narrower than the lugs 42. The tool 46 is raised in the next operation; whereupon one of the sloping surfaces 46c' will contact the guide lug 41, forcing one of the slots 46a' between the lands 46b' to contain it, thereby causing the tool 46 to rotate further so that the slots 46d between the lands 46e will register with the lugs 42; whereupon the tool 46 may be withdrawn, leaving the regulator set, as shown in Fig. 8.

The catching and releasing tool herein shown is similar to the cable pull overshot shown in my Patent No. 2,250,463.

*Removing the regulator and choke assembly*

The same catching and releasing tool as is employed to deposit the regulator in place may be employed to remove it. If the tool 46 be lowered again into the shell 40 as in Fig. 9, it will engage the lands 46e under the lugs 42 when the cable is raised. This operation takes place as follows: As the tool 46 enters the shell 40, the wedge-shaped ends 46f of the holding lands 46e are guided by the guide-lug 41 which is passed through the slots 46d and then is received within one of the slots 46a' in alignment with the slot 46d through which the lug 41 was previously passed. One of the sloping surfaces 46c then contacts the lug 41 and causes one of the slots 46a to contain the lug; thereby producing partial rotation of the tool 46. Then, when the cable is tightened, the sloping surface 46c' contacts the lug 41 and forces one of the slots 46a' to contain the lug. This causes the tool 46 to rotate somewhat further until the lands 46e are directly under the lugs 42.

The cable is now pulled upward with sufficient force to spring the latch, whereupon the regulator and choke assembly may be withdrawn.

It will be noted that the tool 46 takes hold the first time it is inserted into the shell 40 and raised and that it releases this hold after it is caused to engage the lands 46b' again upon the lugs 42 which are somewhat wider than the slots 46a'.

When it is desired to releasably secure the regulator and/or choke within the tubing, it will be noted that the engagement of the tool 46 with the shell 40 is accomplished manually in such manner as to cause the tool to release the shell 40 when the weight 11 forces the tool 46 to engage its lands 46b' upon the lugs 42 and the cable is raised once. In withdrawing the regulator, the tool 46 goes into the tubing one step behind the position it had with respect to the shell 40 in the setting operation. Hence, the tool 46 deposits the regulator in one operation and picks it up in the other.

If, for any reason, it is desired to set another anchoring shell, this may be done in any tubing coupling above the previously set shell, as is evident, all such anchoring shells being recoverable whenever the tubing is withdrawn.

*The modified form of anchoring shell and placing tool*

In Figure 16, the latch shaft 47 has a recess 47b adapted to engage the latch balls for somewhat less than one half their diameter, the shoulder 47a of the shaft 47 being engageable with the shoulder 9b of the shell 9.

The base shell 48 has the internal annular sloping shoulder 48a coacting with the sloping upper surface of the ball floor 49 which is urged upward by the coiled spring 50. The slots 1b between the ribs 1a provide for the escape of pressure fluid exterior of the shell 48 in order to cause the packer 6 to be expanded, as was explained for the similar construction in Fig. 8 (see Fig. 21).

It will be understood that all other parts bearing the same reference characters as in the previous embodiment are the same in construction and purpose as was there stated.

The assembly in Fig. 16 being lowered into the tubing, the weight 11 is dropped over the cable thereby causing the knife 9a to cut the wire 3 and expand the ring 2. The cable is then pulled upward until the latch is sprung, leaving the shell 48 in the same position as the shell 1 in Fig. 8, this position of the shell 48 being shown in Fig. 17.

The latch balls, being properly spaced, will impinge upon each other and remain in place after the setting tool is withdrawn, as also appears in Fig. 17.

*The regulator placed with the modified form of the anchoring shell*

Except for the latch tube intake choke 51, this construction shown in Fig. 18 is so similar to that shown and described in connection with Fig. 8 as to require little further explanation.

The latch balls 18 engage within the circular recess 51a of the latch tube 51, the balls being engaged firmly upon the lower side of the recess 51a, and having slight clearance with this member above them in order to hold the member 51 securely engaged upon the valve seat 1d, as appears in Fig. 18.

Fluid enters the choke 51 through the slots 51b, and passes upward through the choke passage 51c, and the similar opening through the valve seat 31, to be governed by the bellows assembly and the valve 30, as hereinbefore explained.

*The choke with the preferred form of latch*

In Fig. 19, the means above the connection member 54 for attaching the withdrawal tool is the same as was shown and described in connection with Fig. 9.

The connection member 54, having guide fins 54a, is adapted to seat hermetically upon the member 1 by the force of the latch, as previously explained.

The intake nipple 52 corresponds to the nipple 35 in Fig. 8.

The choke 53, having a central passage 53a of proper size, is shown connected threadedly between the nipple 52 and the member 54.

It will be understood that the choke may be secured in the well and removed therefrom in the same manner as was explained for placing and removing the regulator and/or choke assembly.

*The choke with the modified form of latch*

The choke 55, having the central passage 55a of proper diameter, is connected threadedly to the members 52a and 54 and may be placed in the well as shown in Fig. 20 and removed therefrom, as was specified for placing and removing the regulator in Fig. 18.

I claim:

1. In an inserting device for an anchoring shell assembly having an axial bore, a ball recess therein, an expansible outer locking ring and a retaining wire band for the same; a latch shaft secured upon the end of a cable; a ball floor member on said shaft; latch balls on said floor member; a ball rider member slidable on said shaft; spring means on said shaft to cause said rider member to urge said balls outward into said recess; a knife member slidable on said cable for cutting said band; and a weight slidable on said cable to cause the knife to cut said band.

2. An anchoring shell assembly for pressure-controlling devices in a well tube comprising: a shell; expansible spring means carried by the upper outer portion of said shell for locking the same in a coupling cavity of the well tube; releasable means for holding said locking means retracted while inserting the shell in the tube; an elastic packer sleeve on the lower portion of the shell; oppositely projecting retainer flanges engaging the ends of said packer sleeve, one of said flanges being detachable from the shell, the shell having an opening to communicate fluid pressure from its interior to the inner side of the packer sleeve; and an annular projection on the exterior of said sleeve to retard passage of pressure fluid from below the shell upward between the sleeve and the well tube so that pressure will build up within the packer sleeve.

3. A tubular anchoring shell adapted to be secured in a tubular member in a well; an expansible ring means holding said ring on said shell; a wire compressing said ring; and means for severing said wire when the shell is in said tubular member for releasing said ring to permit it to expand and anchor said shell in the tubular member.

4. A tubular anchoring shell adapted to be secured in a tubular member in a well; an expansible ring means holding said ring on said shell; a wire on said ring compressing the ring; a cable-carried knife adapted to be lowered into the well; and means for operating said knife, when in place in the well, to cause said knife to sever said wire and thereby release said ring to expand.

5. An anchoring shell adapted to be secured in a jointed well tube; an expansible ring carried by said shell and adapted, when released, to engage in a joint of the well tube to lock the shell in the tube; a wire holding said ring compressed while placing the shell in the tube; means having a releasable latching engagement with the shell for lowering it into the well tube; and means associated with said lowering means for thereafter cutting said wire to release said ring to effect locking of said shell and permit the lowering means to be withdrawn from the well.

6. In an anchoring assembly for securing pressure-regulating means within a tubular member in a well, said member having a recess; a shell; a packer member mounted on said shell; means for effecting expansion of said packer member by fluid pressure within the shell; an expansible ring for securing said shell within a joint of said tubular member; and means for holding said ring contracted while inserting the shell into the tubular member, said last named means being adapted to be thereafter released for securing the assembly in the well tube.

7. An anchoring shell for wells having jointed tubes with interior recesses; a compressed ring on said shell, said ring being adapted to expand within one of the tube joints when the ring is permitted to expand and thereby secure the shell in the well tube; a wire operatively engaging said ring to initially hold said ring compressed; in combination with a knife adapted to cut said wire; means for lowering said shell and said knife into the well; and a weight cooperating with said lowering means for engaging said knife to cause the knife to sever the wire and thereby permit said ring to expand.

8. An anchoring shell adapted to be secured within a tubular member in a well, said shell having a recess around the same; an expansible ring located in said recess and having a transverse knife-receiving opening; a wire compressing said ring in said recess; said shell having a longitudinal bore with an inclined entrance and having a latch ball recess; a latch shaft insertable within said bore; a ball floor on said shaft; a ball rider on said shaft; balls held between said floor and said rider, said floor and said rider having inclined ball-engaging faces; a spring on said shaft for pressing said rider against said balls; means for suspending said shaft; means carried by said suspending means and including a knife for severing said wire when desired to release said setting ring; and a packer device carried by said shell.

9. An anchoring shell having an axial passage with a recess in the same and being adapted to be placed within a tubular member in a well, which tubular member has internal recesses; an expansible means on the shell for engaging in one of said tubular member recesses to lock the shell in place; means for holding said expansible means inactive while placing the shell in position in the tubular member; a device for lowering said shell into the well and releasing said expansible means, said device comprising a latch shaft; a cable connected to said shaft for lowering the same into the well; a spring-loaded latch means between said shaft and the inner wall of said shell for releasably connecting said shell to said latch shaft; and means carried by said cable for releasing said holding means to permit said expansible means to expand and engage in an internal recess of the tubular member in the well.

10. An anchoring shell assembly adapted to be secured in a tubular member in a well having coupled sections, said assembly comprising: a shell with a peripheral recess around the same; a setting ring in said recess and having a transverse opening and adapted to expand into a coupling between adjacent sections of the well tube; a wire initially compressing said ring; said opening being adapted to receive a knife to cut said wire when the assembly has been lowered into the well; said shell having longitudinal slots to receive said knife and having an axial opening with a latch ball recess in the wall of said opening; and a packer on said assembly, said packer being adapted to be expanded by pressure from within the shell.

11. An anchoring shell adapted to be lowered into a tube in a well; an expansible ring on the exterior of said shell; means holding said expansible ring on said shell; means to hold said ring contracted while the shell is being lowered into the well tube; a cable; a shell setting tool on said cable cooperatively and releasably connected with the shell for placing the shell in the tube; and means adapted to be lowered on said cable for releasing said means which holds said ring contracted to permit said ring to expand into engagement with the well tube.

12. A tubular anchoring shell adapted to be secured in a tubular member in a well; an expansible ring; means for holding said ring on said shell; means to hold said ring compressed while said shell is being lowered to a position in the tubular member; a cable-carried means, adapted to be lowered into the well for use in effecting a release of the means which holds said ring compressed; in combination with a weight adapted to actuate said cable-carried means for the purpose of releasing the means that holds the ring compressed in order to permit said ring to expand and anchor said shell in said tubular member.

ALEXANDER BOYNTON.